(12) United States Patent  (10) Patent No.: US 6,389,701 B1
Friedland  (45) Date of Patent: May 21, 2002

(54) HAND TOOL SAFETY SHROUD

(75) Inventor: Leonard Friedland, Monsey, NY (US)

(73) Assignee: Gyros Precision Tools, Inc., Monsey, NY (US)

( * ) Notice: Subject to any disclaimer, the term of this patent is extended or adjusted under 35 U.S.C. 154(b) by 0 days.

(21) Appl. No.: 09/466,561

(22) Filed: Dec. 17, 1999

(51) Int. Cl.$^7$ .......................... B23D 45/16; B26B 29/00
(52) U.S. Cl. ........................ 30/391; 30/284; 83/478; 451/451; 74/609; 144/251.3
(58) Field of Search ................ 30/283, 284, 285, 30/286, 390, 391; 83/478; 451/451, 452, 454, 455; 74/609; 408/241 G; 409/134; 144/154.5, 251.1, 251.3, 252.1

(56) References Cited

U.S. PATENT DOCUMENTS

| | | | | |
|---|---|---|---|---|
| 1,900,553 A | * | 3/1933 | Hampton | 30/391 |
| 2,366,017 A | | 12/1944 | Fortune | 30/167 |
| 2,861,607 A | * | 11/1958 | Emmons | 30/391 |
| 2,898,957 A | | 8/1959 | Demarkis | 144/136 |
| 3,706,332 A | * | 12/1972 | George | 30/391 |
| 3,787,973 A | * | 1/1974 | Beisch et al. | 30/391 |
| 3,877,148 A | * | 4/1975 | Huber | 30/391 |
| 4,856,394 A | * | 8/1989 | Clowers | 30/391 |
| 5,012,582 A | | 5/1991 | Bristol et al. | 30/391 |
| 5,235,753 A | * | 8/1993 | Stumpf | 30/391 |
| 5,768,786 A | | 6/1998 | Kane et al. | 30/276 |
| 5,974,674 A | * | 11/1999 | Kelly | 30/391 |

FOREIGN PATENT DOCUMENTS

WO    WO85034    8/1985

* cited by examiner

Primary Examiner—M. Rachuba
Assistant Examiner—Thomas J. Druan, Jr.
(74) Attorney, Agent, or Firm—Rosenman & Colin LLP

(57) ABSTRACT

A hand tool is fitted with a fixed shield and a movable shield which is rotatably mounted around the fixed shield. The two shields are aligned with one another by each shield being keyed into a countersunk washer formed with an anchor slot for the fixed shield and a semi-annular guideway for the movable shield. A torsion spring normally biases the movable shield into a closed position about the fixed shield.

8 Claims, 15 Drawing Sheets

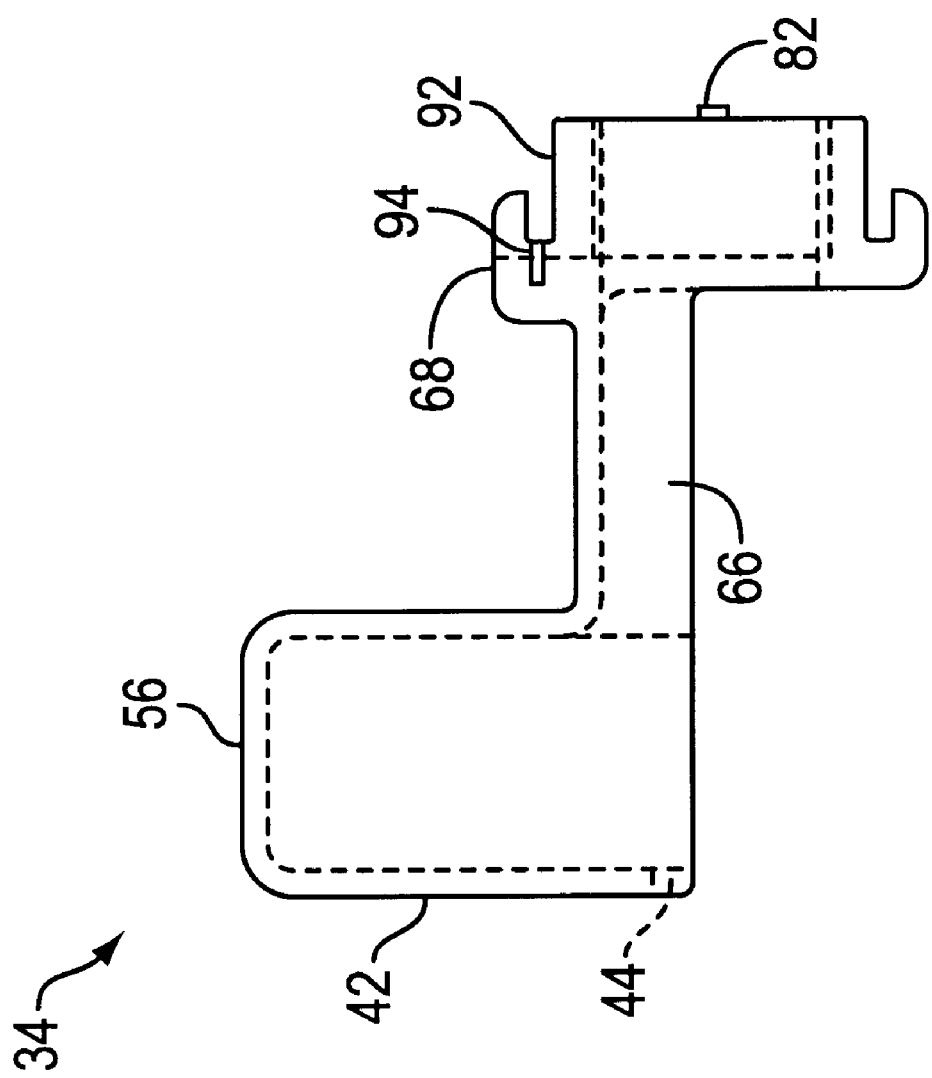

HAND TOOL SAFETY SHROUD

BACKGROUND OF THE INVENTION

1. Field of the Invention

The present invention relates in general to protective shields for covering rotating cutting tools, and relates in particular to a spring-biased tubular safety shroud for use with hand-held motorized tools.

2. Description of Prior Developments

Shrouds, covers and shields have been used with various hand-held cutting tools for the purpose of protecting a user and others from unintentional inadvertent contact with a cutting bit or blade. Many of these shrouds provide only partial coverage of the blade, while others involve a complex assembly of multiple parts.

Although some prior shrouds provide full coverage of a blade, they must be manually opened and manually closed. With such a design, an operator can forget to close the shroud after use and thereby defeat the purpose of the shroud. Moreover, many conventional shrouds must be removed from a tool to allow an operator to change a bit or blade.

Accordingly, a need exists for a shroud or shield for a hand-held rotary tool wherein the shroud provides substantially complete coverage of a cutting blade or bit.

A further need exists for such a safety shroud which provides for the automatic closure of the shroud upon disengagement of the tool from a workpiece and/or release of a shroud actuator by a tool operator.

Another need exists for such a shroud which has relatively few parts and is of relatively simple construction.

Yet another need exists for such a shroud which allows for tool blade removal and replacement without removal of the shroud from the tool for at least selected tools.

SUMMARY OF THE INVENTION

The present invention has been developed to fulfill the needs noted above and therefore has as an object the provision of a safety shroud for substantially covering a cutting blade or bit on a rotary hand tool.

Another object of the invention is to provide a hand tool shroud which has a relatively simple construction, relatively few parts, and is easy to assemble and disassemble.

Yet another object of the invention is the provision of a hand tool shroud having a stationary portion and a movable portion which may be manually actuated to expose a cutting blade or bit.

Still another object of the invention is to provide a hand tool shroud having a spring-biased movable shroud portion which closes automatically upon release of a shroud actuator or upon disengagement of the shroud from a workpiece.

Another object of the invention is the provision of a hand tool shroud which allows for the removal and replacement of cutting blades and bits without removal of the shroud from the hand tool, for at least some tools.

These and other objects are met by the present invention which is directed to a hollow tubular shroud having a pair of opposed, nesting shroud portions. One shroud portion is stationary, while the other is movable into a nested position within the stationary portion to expose a cutting blade or bit. A conveniently located thumb lever is provided on the exterior of the movable shroud portion to allow an operator to manually open the shroud.

The movable shroud portion is biased into a normally closed position by a torsion spring. In this manner, when an operator releases the thumb lever and/or disengages the movable shroud from a workpiece, the torsion spring automatically closes the shroud. To improve visibility, the shroud can be formed of optically clear plastic such as a molded polycarbonate such as Lexan® plastic.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 5 is a side elevation view of the stationary shield of FIG. 1;

In the various figures of the drawings, like reference characters designate like or similar parts.

DETAILED DESCRIPTION OF THE PREFERRED EMBODIMENTS

Figure 1:
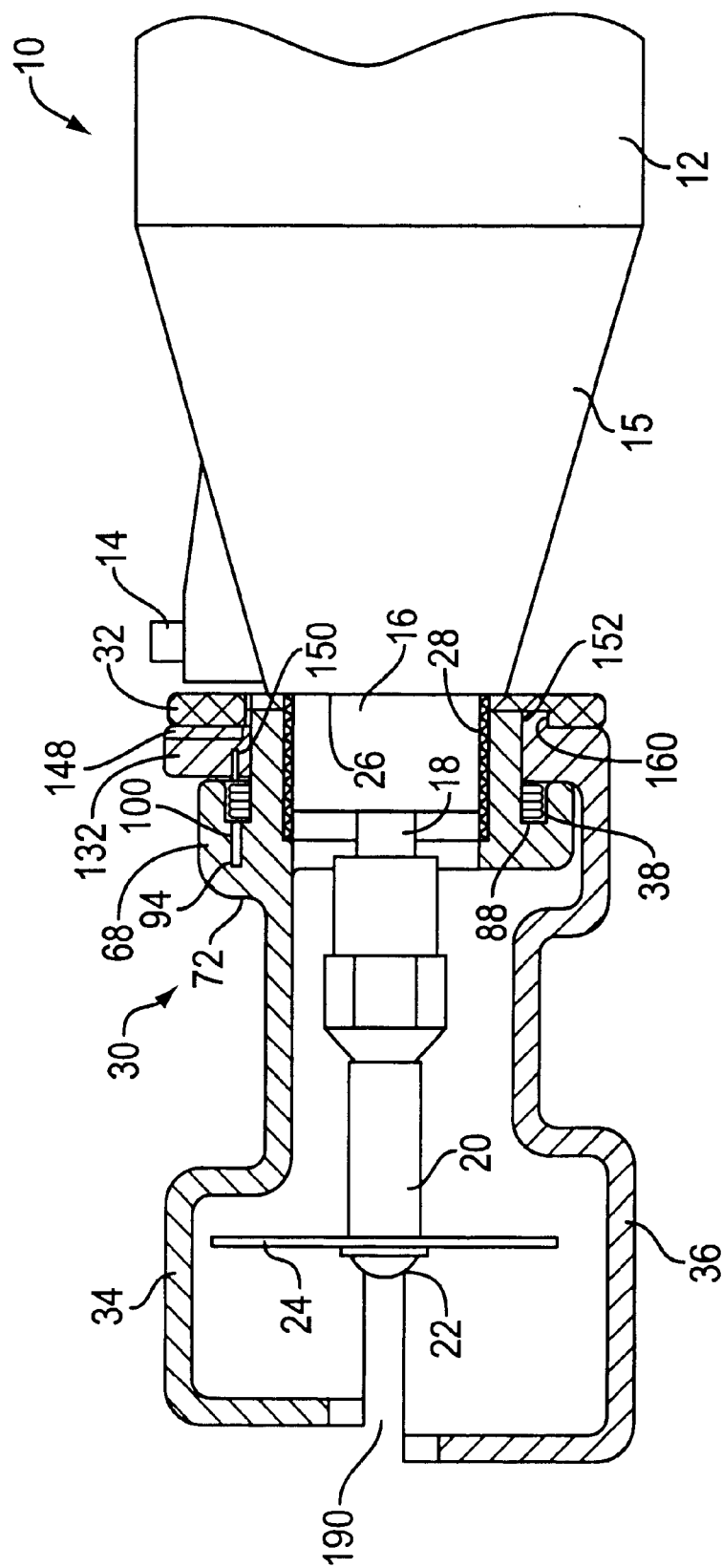
FIG. 1 is a partially sectioned side elevation view of a safety shroud assembly constructed in accordance with the invention and shown mounted to a hand-held tool.

The present invention will now be described in conjunction with the drawings, beginning with FIG. 1 which shows a hand-held tool 10 of known construction. For example, tool 10 can take the form of an electrically-powered hand tool sold under the brand name Dremel. Such tool 10 will be illustrated for purposes of example and to illustrate the protective shroud of the invention. It will be understood that the safety shroud will be operable with other tools from other manufacturers, although minor modifications in the design of the attachment means of the invention, or the manner in which the shroud is coupled to the hand tool, might be necessary to accommodate tools of other manufacturers. Tool 10 includes a cylindrical handle 12 which houses a motor and drive train. A spindle lock 14 is provided on the frustoconical front end 15 of tool 10.

A motor output shaft 18 extends from a threaded housing 16. Shaft 18 is ultimately coupled to a threaded mandrel 20 on which a removable cutting blade or bit is mounted with a threaded fastener 22. In the example of FIG. 1, the cutting tool 24 is a miniature circular saw blade.

The front end 15 of tool 10 extends up to a flat annular shoulder 26 from which extends a cylindrical, externally-threaded collar or nose 28. Up to this point, the description of tool 10 has been directed to a well-known construction.

The invention is particularly directed to a shroud or shield assembly 30 which is removably mounted to the threaded nose 28 of tool 10 to cover the cutting tool, mandrel, chuck and threaded housing. Shroud assembly 30 includes four major components, i.e., a backing plate or washer member 32, a stationary shield 34, a movable or pivoting shield 36 and a biasing torsion spring 38 which rotationally and circumferentially biases the movable shield 36 into a closed position around the stationary shield 34.

The washer member 32, stationary shield 34 and movable shield 36 are preferably formed of clear molded plastic such as optically clear Lexan plastic to help a tool operator to see through these components and clearly view the cutting tool 24 as it is being used. Lexan-type plastic is also desirable because of its shatter-resistant, bulletproof qualities, that further protect the user of the hand tool from debris and sparking. The spring 38 can be formed of music wire or the like.

Details of the stationary shield 34 are shown in FIGS. 2 through 6 wherein a substantially semi-cylindrical open hood 40 is molded with a front substantially semi-circular segment-shaped front end wall 42 having a semi-circular segment-shaped front recess 44 formed midway along its exposed chordal edge 46. Hood 40 further includes a generally semi-circular segment-shaped rear end wall 48 having a generally semi-circular segment-shaped rear recess 50 formed midway along its exposed chordal edge 52. A generally semi-cylindrical hood wall or outer wall 56 extends axially and circumferentially between the front and rear planar end walls 42, 48 so as to define an open pocket 58 having a generally rectangular opening defined between the front and rear edges 46, 52 and the axially-extending side edges 60, 62 bordering the circumferential ends of wall 56.

A generally semicylindrical channel 64 extends concentrically, coaxially and rearwardly from the rear recess 50. Channel 64 is defined by an open trough wall 66 which extends from the rear end wall 48 to an annular, axially-stepped collar 68. A circular internally-threaded bore 70 formed in collar 68 is coaxially aligned with the front and rear recesses 44, 50 and with channel 64.

Collar 68 includes a segment-shaped axially-extended front portion 72 and a cylindrical tubular portion 74. A pair of generally radially-extending steps 76 define an axial ridge or ledge separating collar portions 72 and 74. Steps 76 are coplanar with the edges 78 of channel 64 and with front and rear edges 46, 52 and with side edges 60, 62 on the hood 40.

Figure 2:
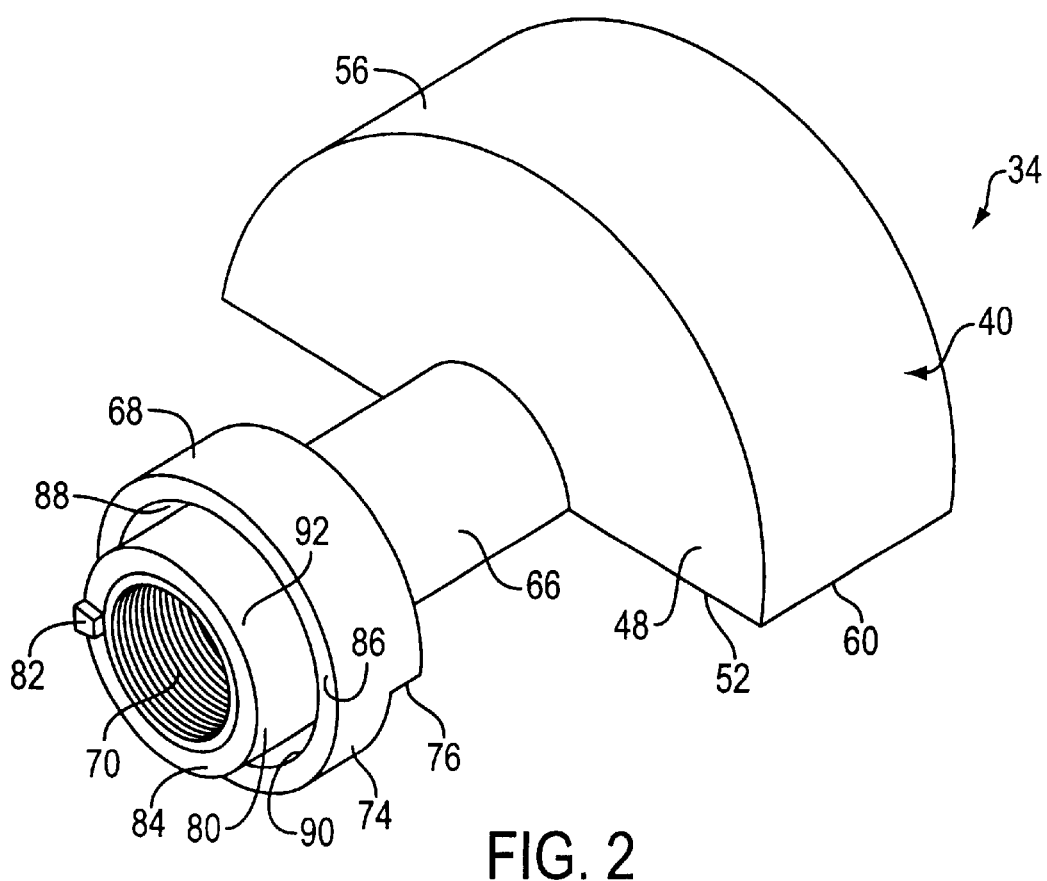
FIG. 2 is a perspective view of the top of the stationary shield of FIG. 1.

As seen in FIG. 2, a cylindrical internally-threaded sleeve 80 extends coaxially within and rearwardly from the collar 68. Sleeve 80 forms a continuous extension of the trough 66 and includes and defines the threaded bore 70. An alignment key or peg 82 projects axially rearwardly from the rear annular end face 84 of sleeve 80. End face 84 is spaced axially rearwardly from end face 86 of collar 68 by a predetermined distance.

Figure 4:
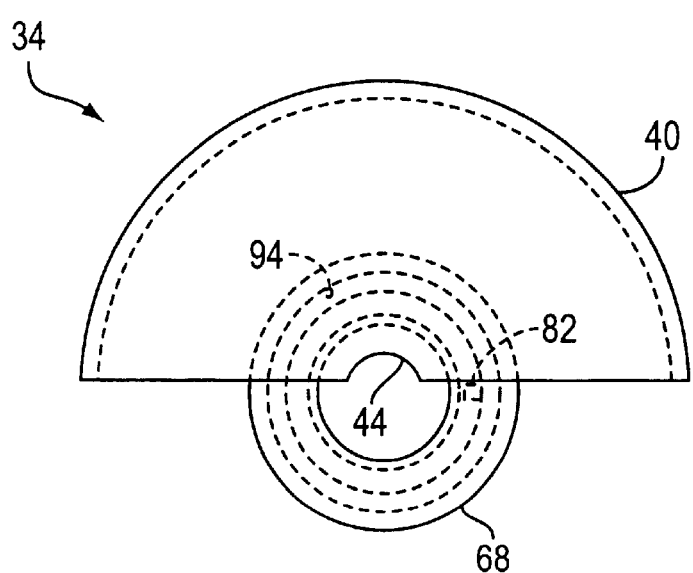
FIG. 4 is a front end view of the stationary shield of FIG. 1.
Figure 3:
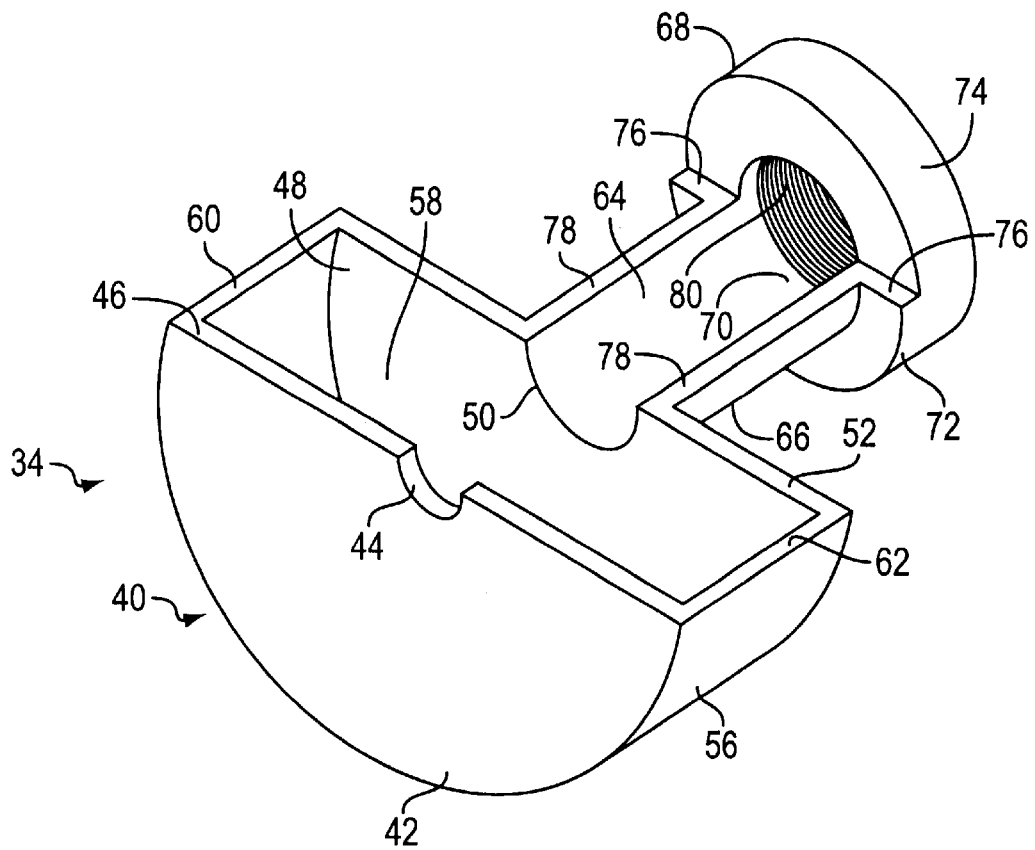
FIG. 3 is a perspective view of the bottom of the stationary shield of FIG. 1.
Figure 6:
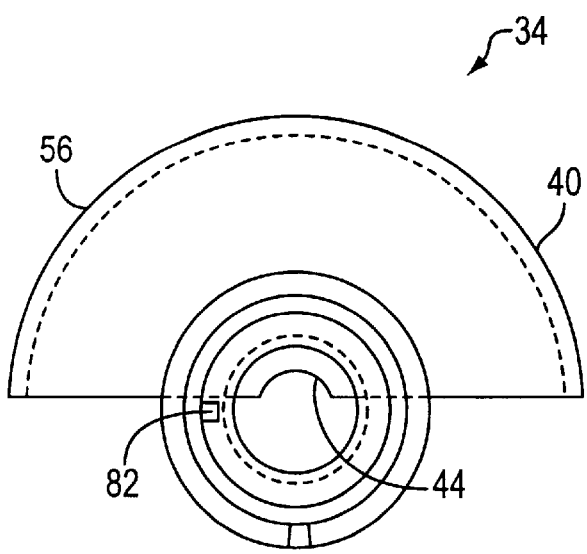
FIG. 6 is a rear end view of the stationary shield of FIG. 1.
Figure 7:
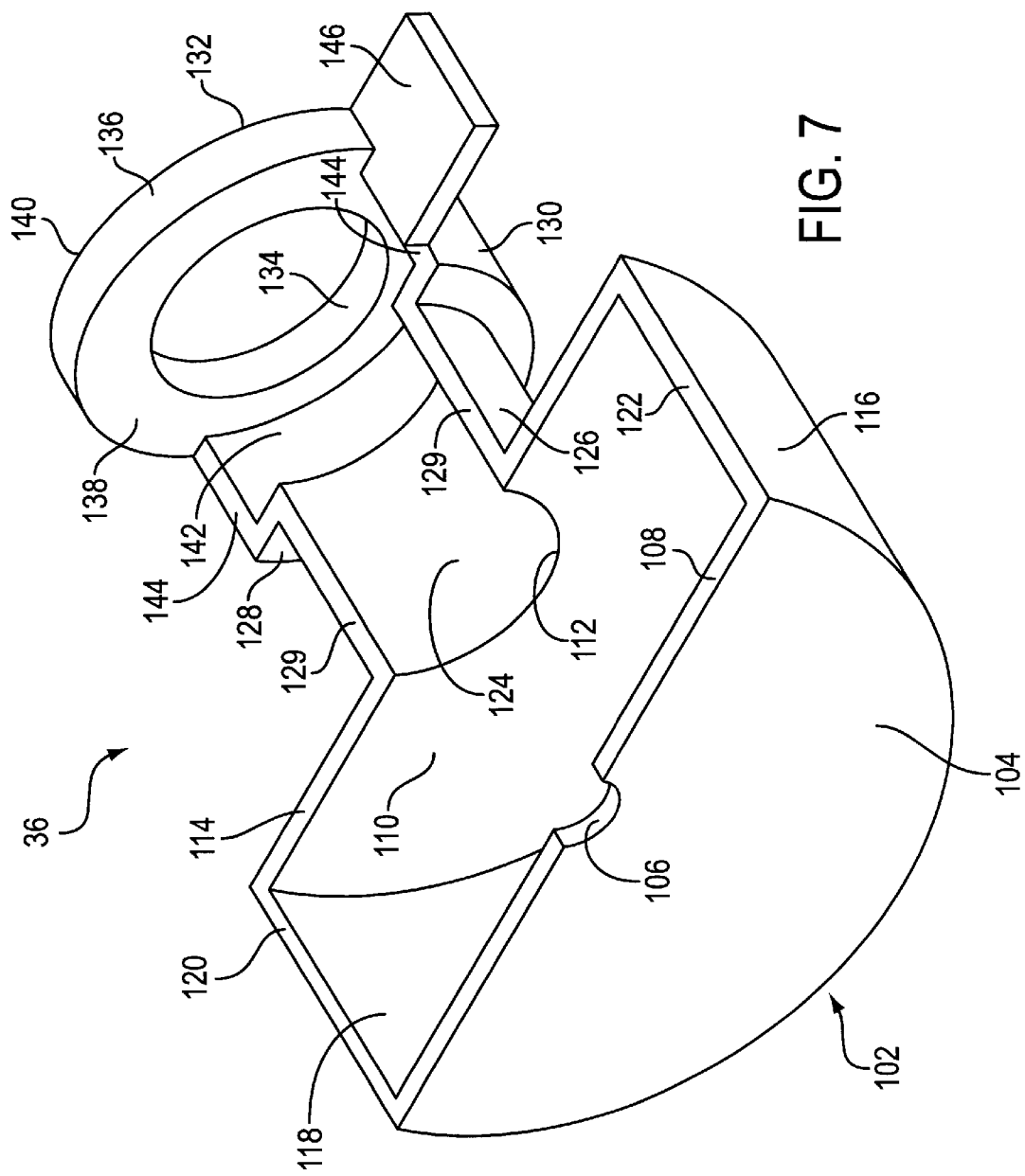
FIG. 7 is a perspective view of the top of the rotating shield of FIG. 1.

An annular pocket 88 is formed between the inner surface 90 of collar 68 and the outer surface 92 of sleeve 80. Pocket 88 and surfaces 90 and 92 form an annular bushing or guide within which the torsion spring 38 is nested, supported and guided. As seen in FIGS. 1 and 4, a small axial bore 94 is formed in the bottom of pocket 88 and extends into or towards the front portion 72 of collar 68 for receiving and anchoring the front axial free end 100 of spring 38.

Details of the moving or pivoting shield 36 are shown in FIGS. 7 through 10. Shield 36 includes a substantially semi-cylindrical open hood 102 which is similar in shape but axially and radially larger than the open hood 40 on the stationary shield 34. Hood 102 has a substantially semi-circular segment-shaped front end wall 104 having a substantially semicircular segment-shaped front recesses 106 formed midway along its exposed chordal edge 108.

Hood 102 further includes a generally semicircular segment-shaped rear end wall 110 having a generally semi-circular segment-shaped rear recess 112 formed midway along its exposed chordal edge 114. A generally semicylindrical hood or outer wall 116 extends axially and circumferentially between the front and rear end walls 104, 110 so as to define an open pocket 118 having a generally rectangular opening defined between the front and rear edges 108, 114 and the axially-extending side edges 120, 122 bordering the circumferential ends of wall 116.

A generally semicylindrical channel 124 extends concentrically, coaxially and rearwardly from the rear recess 112. Channel 124 is defined by an open trough wall 126 which extends from the rear end wall 110 of hood 102 to a radially-outwardly extending substantially semi-annular flange wall 128. Trough wall 126 is bordered by edge wall surfaces 129. A substantially semicylindrical wall 130 extends axially rearwardly from the flange wall 128 to an annular guide ring 132. Ring 132 is aligned coaxially with trough 124 and with wall 130 and has the same outside radius as wall 130 so that a portion of the outer circumference of surface 136 of ring 132 is coextensive with the outer circumferential surface of wall 130.

The inner circumference 134 of ring 132 forms a bearing surface which pivots over the outer surface 92 of sleeve 80 on the stationary shield 34. The annular front face 138 of ring 132 forms a guide surface which bears rotationally against the end face 86 on collar 68 on the stationary shield 34. The annular rear face 140 of ring 132 bears against the washer 32 as described further below.

A generally semi-annular pocket 142 is defined between the flange wall 128, the front face 138 of ring 132 and the generally semicylindrical wall 130. Pocket 142 is dimensioned to receive and freely pivot about collar 68 of the stationary shield 34. Pocket 142 is circumferentially delimited by axially-extending edges 144.

A finger or thumb tab or lever member 146 is connected to one of the edges 144 as well as to front face 138 and the circumferential surface 136 of ring 132 for rotating the movable shield 36 about the stationary shield 34. A small axial bore 148 (FIGS. 1 and 8) is formed through ring 132 to receive and anchor the other free end 150 of coiled torsion spring 38. An axially-rearwardly projecting alignment key or peg 152 is formed on the rear face 140 of ring 132 for guiding the movable shield 36 within washer 32 as discussed below.

Figure 11:
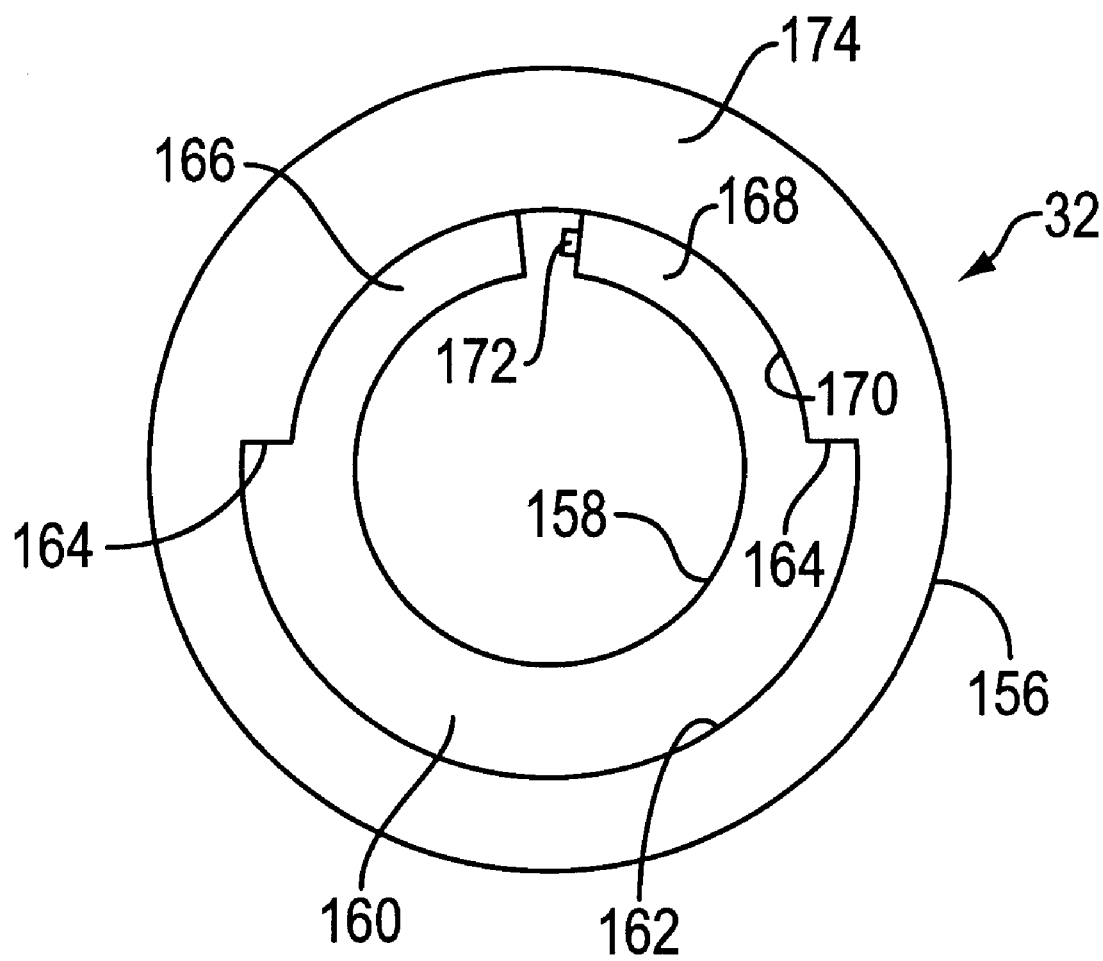
FIG. 11 is a front end view of the washer of FIG. 1.
Figure 12:
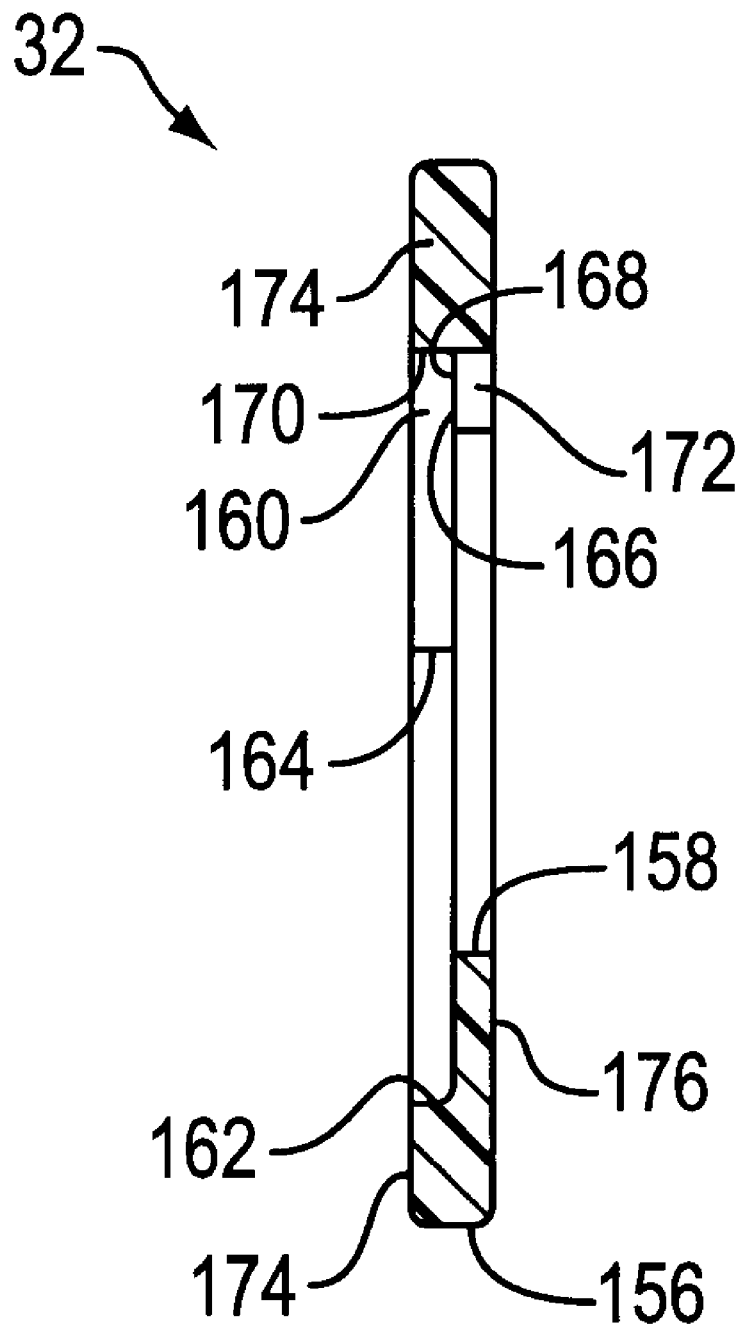
FIG. 12 is a side elevation view, in section, of the washer of FIG. 1.

The last major component of the shroud assembly 30 is the washer member or backing plate 32 shown in detail in FIGS. 11 and 12. Washer 32 has a circular outer circumference 156 dimensioned about the same as the outer circumference of surface 136 on ring 132 of the movable shield 36. A countersunk inner or rear circular bore 158 of washer 32 has a diameter slightly larger than that of the housing 16 on tool 10 to allow the washer to center itself over such housing.

Circular bore 158 extends axially forwardly into an asymmetrical about the horizontal plane, radially-stepped front countersink 160 which receives and guides the alignment key 152 located on the rear face 140 of ring 132 on the movable rotating shield 36. The front countersink 160 includes a substantially semi-annular guideway 162 which extends over an arc slightly in excess of 180 degrees. Guideway 162 terminates at generally radially-inwardly extending steps 164 which limit the rotation of the movable shield around the stationary shield via abutment with the alignment key 152 on the movable shield.

Steps 164 extend radially inwardly from guideway 162 into a generally semi-annular recess or seat 166 which closely receives and centers the rear annular end face 84 and outer surface 92 of sleeve 80 on the stationary shield 34. A radial face 168 on seat 166 receives the end face 84 of sleeve 80 and an axial face 170 on seat 166 receives the outer surface 92 of sleeve 80.

An alignment slot or recess 172 is formed through seat 166 at a position circumferentially midway between steps 164. Slot 172 is dimensioned to closely receive and circumferentially anchor the alignment key 82 on sleeve 80 of the stationary shield 34. The flat front face 174 on washer 32 provides a thrust bearing surface against which the rear face 140 of ring 132 on the movable shield rotates. The rear flat face 176 on washer 32 seats against the flat annular shoulder 26 on tool 10 when the collar 68 on the stationary shield is screwed onto the collar 28 on the tool 10.

Figure 14:
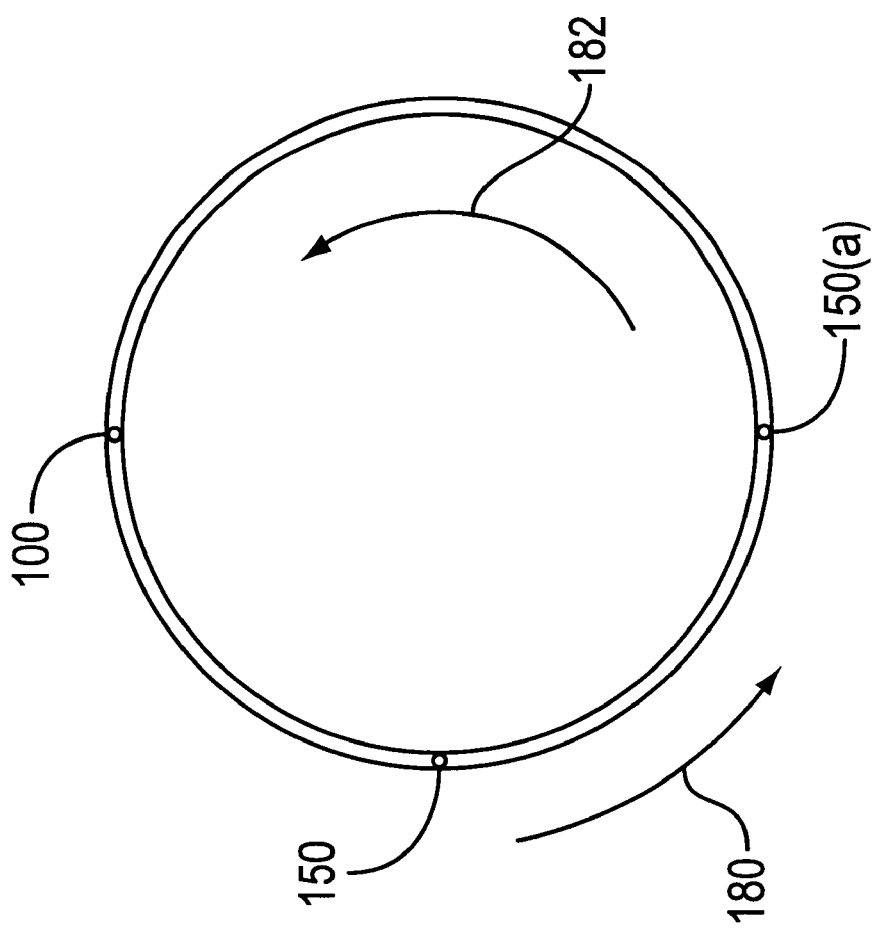
FIG. 14 is a right or rear end view of the torsion spring of FIG. 13.
Figure 13:
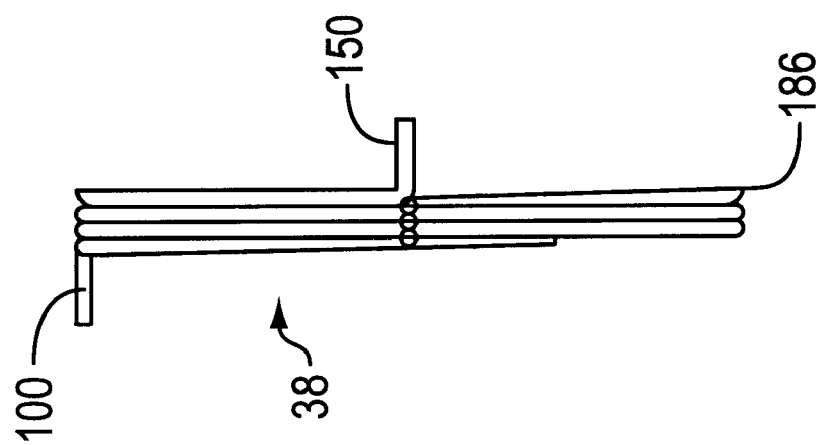
FIG. 13 is a side elevation view of the torsion spring of FIG. 1.

Details of the torsion spring 38 are shown in FIGS. 13 and 14 wherein the fixed free end 100 and moving free end 150 of spring 38 are shown in their at rest positions circumferentially displaced by about 90 degrees. As seen in FIG. 14, when the shroud assembly 30 is assembled, the movable free end must be rotated 90 degrees in the direction of arrow 180 to position 150(a) to provide a biasing preload to the movable shield 36 as shown in FIG. 1. In both cases, the spacing can be varied to provide a desired preload biasing on the spring.

When the movable shield 36 is fully opened by being rotated 180 degrees, the movable end 150 of spring 38 is also rotated 180 degrees. In the embodiment shown, this is to a point axially coincident with the spring's fixed end 100 in FIG. 14, i.e. at the 12 o'clock position. Spring 38 may be formed with three or more coils 146 to provide the appropriate spring rate. The position may vary based upon the placement of the fixed ends of the spring.

The shroud assembly 30 may be used on tool 10 as follows. The threaded mandrel 20, without any blade, bit or other accessory attached, is inserted into chuck, which extends from the threaded housing 16. The chuck is then tightened around the mandrel and the fully assembled shroud assembly 30 is then mounted to tool 10. Assembly of the shroud assembly 30 can begin by inserting the fixed free end 100 of coil spring 38 into bore 94 in the stationary shield 34. The other movable end 150 of spring 38 is then inserted into the bore 148 in the movable shield 36 as the two shields 34, 36 are assembled together.

The washer member 32 is then mounted onto the subassembly of the two shields 34, 36 and torsion spring 38. The alignment key 82 on the stationary shield 34 is inserted into the alignment slot 172 on washer 32 and the alignment key 152 on the rotating shield 36 is positioned within the countersunk or undercut portion 160 of guideway 162 on washer 32. If desired in this embodiment, the stationary shield may be secured in some fashion to the washer member, such as by gluing or ultrasonic welding or the like. This completes the assembly of the shroud assembly 30.

Figure 8:
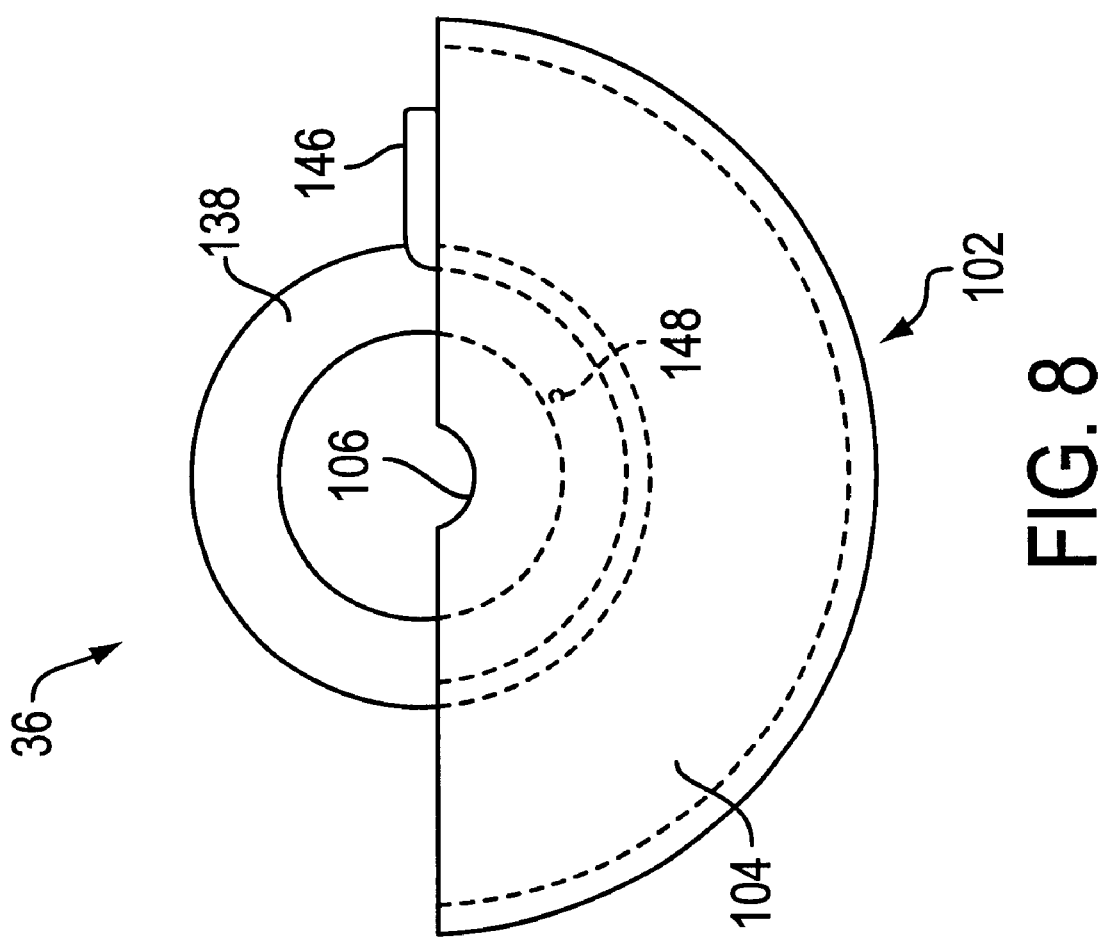
FIG. 8 is a front end view of the rotating shield of FIG. 1.
Figure 9:
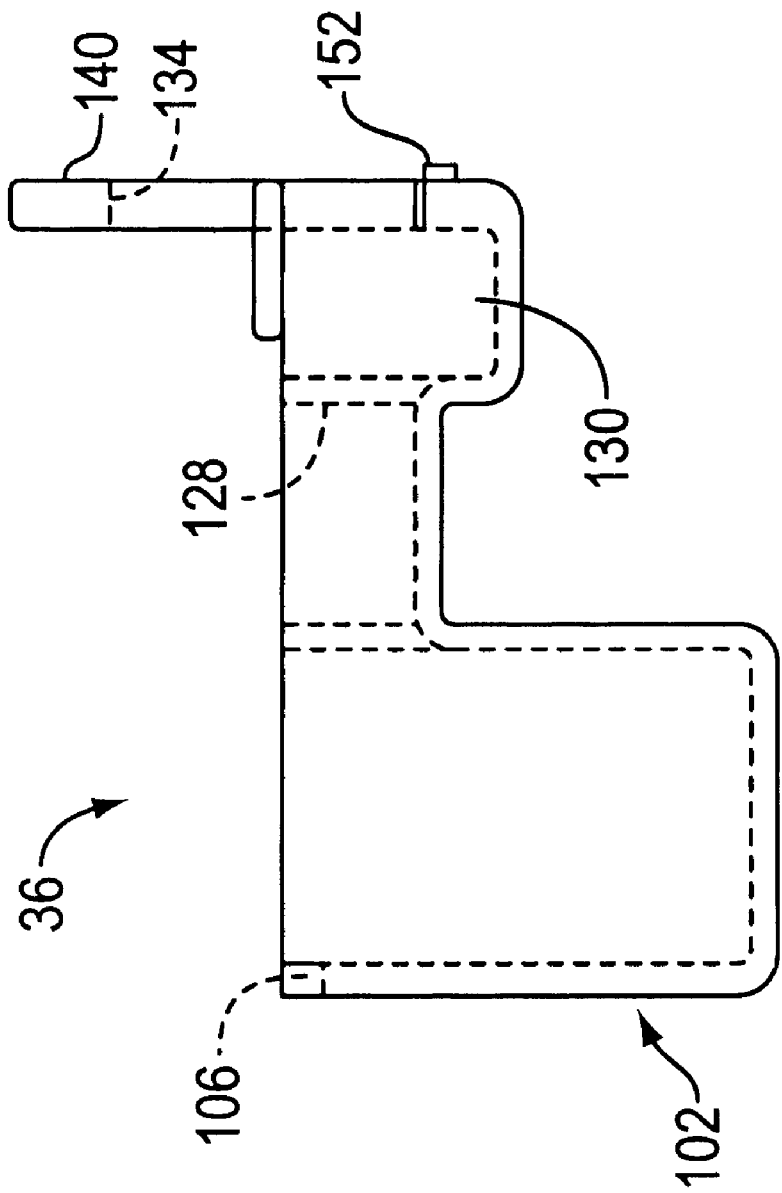
FIG. 9 is a side elevation view of the rotating shield of FIG. 1.
Figure 10:
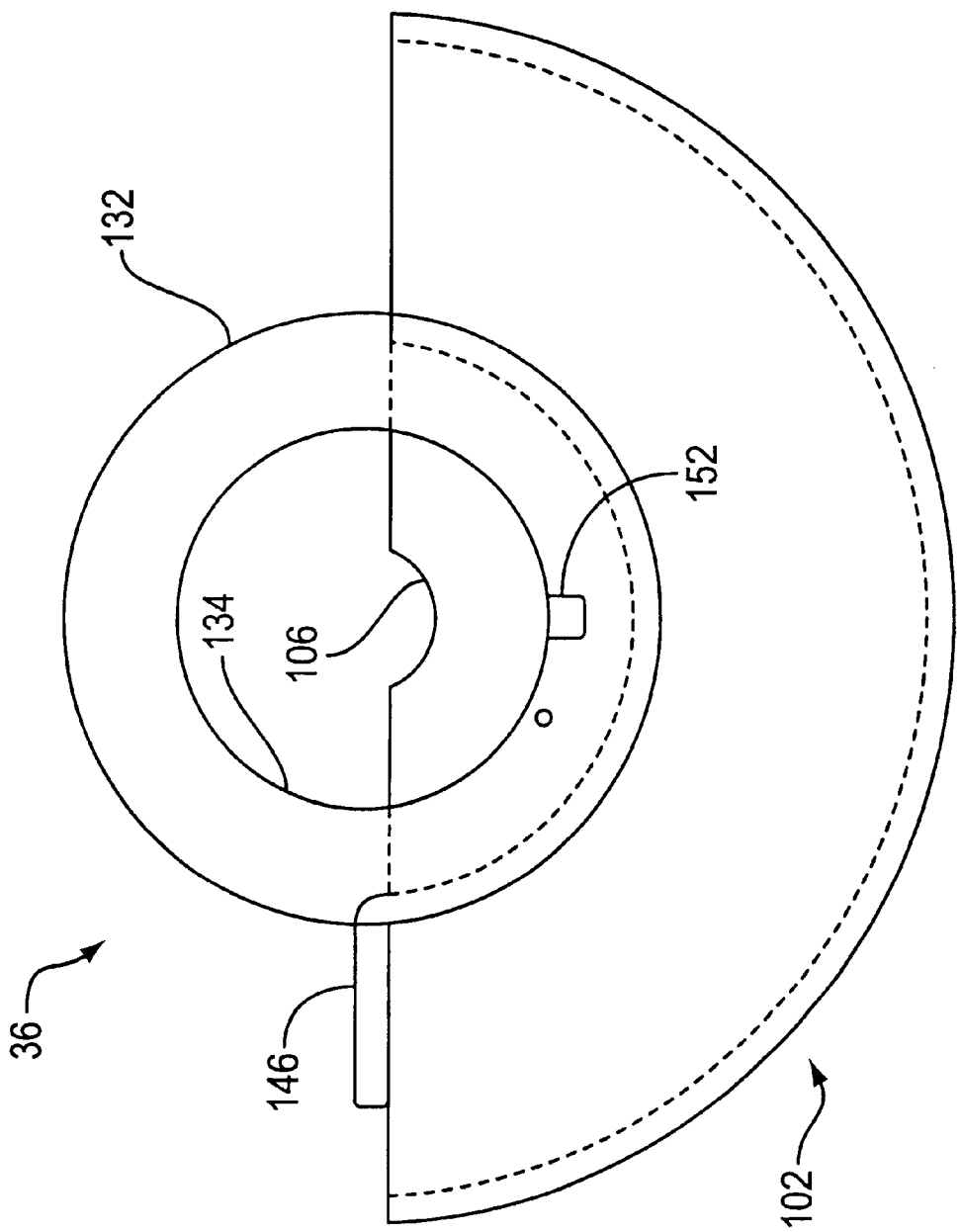
FIG. 10 is a rear end view of the rotating shield of FIG. 1.

The shroud assembly 30 is then screwed onto the threaded collar or nose 28 on tool 10 such that the threaded bore 70 on collar 68 of the stationary shield 34 engages the threads on tool collar 28. The thread pattern on bore 70 is matched to or "registered" with a known thread pattern on tool collar 28 so that when the threads in bore 70 are fully engaged, seated and bottomed out on the threads on collar 28, the assembled shields 34, 36 are respectively screwed into proper clamping and sliding engagement against the washer member 32. With the threaded bore 70 fully seated on collar 28, the thumb tab 146 on the movable shield 36 is located at the 3 o'clock position when viewed from a left axial end view in FIG. 1 and as seen in FIG. 8. In certain situations, it might be desirable to have the thumb tab 146 positioned in the rest, or biased preload, position on the opposite site, i.e., at the 9 o'clock position when viewed from a left axial end view in FIG. 1, particularly if the user is left-handed. The thumb tab 146 on the movable shield 36 can be located in a different position than that shown in FIG. 8. At this point, the movable shield 36 is opened with thumb tab 146 and an accessory such as tool 24 is then mounted on mandrel 20. Threaded fastener 22 is then threaded into mandrel free end 20 and tightened against tool 24 using a tool such as a screwdriver inserted through front recesses 44 and 106.

The shroud assembly 30 is opened by an operator depressing the thumb tab or lever 146 on the movable shield 36. If the thumb tab 146 were relocated, the operation could be modified to provide for lifting of the thumb tab. The reaction force to this movement tends to further tighten the threads in bore 70 onto the threads on tool collar 28. The movable shield 36 rotates around the stationary shield 34 and thereby exposes the tool 24 for use.

The stationary shield 34 is locked in position by being securely threaded against the washer 32 and by its alignment key 82 being inserted into the alignment slot 172 in washer member 32 so that the stationary shield cannot rotate independently of the washer member 32. When the shroud assembly 30 is properly assembled as described above, the movable shield 36 is loosely held between the end face 86 on collar 68 of the stationary shield 34 and the front face 174 on washer 32 with an axial clearance of, for example, 0.020 inch. This clearance allows the movable shield 36 to freely rotate over the outer surface 92 of sleeve 80 on the fixed stationary shield 34.

The alignment key 152 on the movable shield 36 is captured within guideway 162 on washer 32 and thereby limits the maximum open and closed positions of the movable shield. When at rest as shown in FIG. 1, an axially-extending diametral gap 190 is defined between the edge surfaces 108, 120, 122, 129 and 144 on the movable shield 36 and edge surfaces 46, 60, 62, 76 and 78 on the stationary shield 34.

The amount of opening between the shields 34, 36 can be controlled by thumb pressure alone on thumb tab 146 or by pressure of the work against the movable shield 34. When opening pressure is released from the open movable shield 36 and/or thumb tab 146, the torsion spring 38 automatically closes the movable shroud back to its closed at rest position shown in FIG. 1.

There has been disclosed heretofore one embodiment of the invention presently contemplated. However, it is to be understood that various changes and modifications may be made thereto. For example, each shield 34, 36 can be formed as a uniform diameter semi-cylinder so as to simplify its design and eliminate the central necked down portion of the shroud assembly. Moreover, the rotating movable shield 36 can be chamfered to reduce the need for the use of the thumb tab 146 and since the gap 190 exposes the axially extending edges on the movable shield, a workpiece can be pressed against these edges at the start of a cut to open the movable shield.

Figure 15:
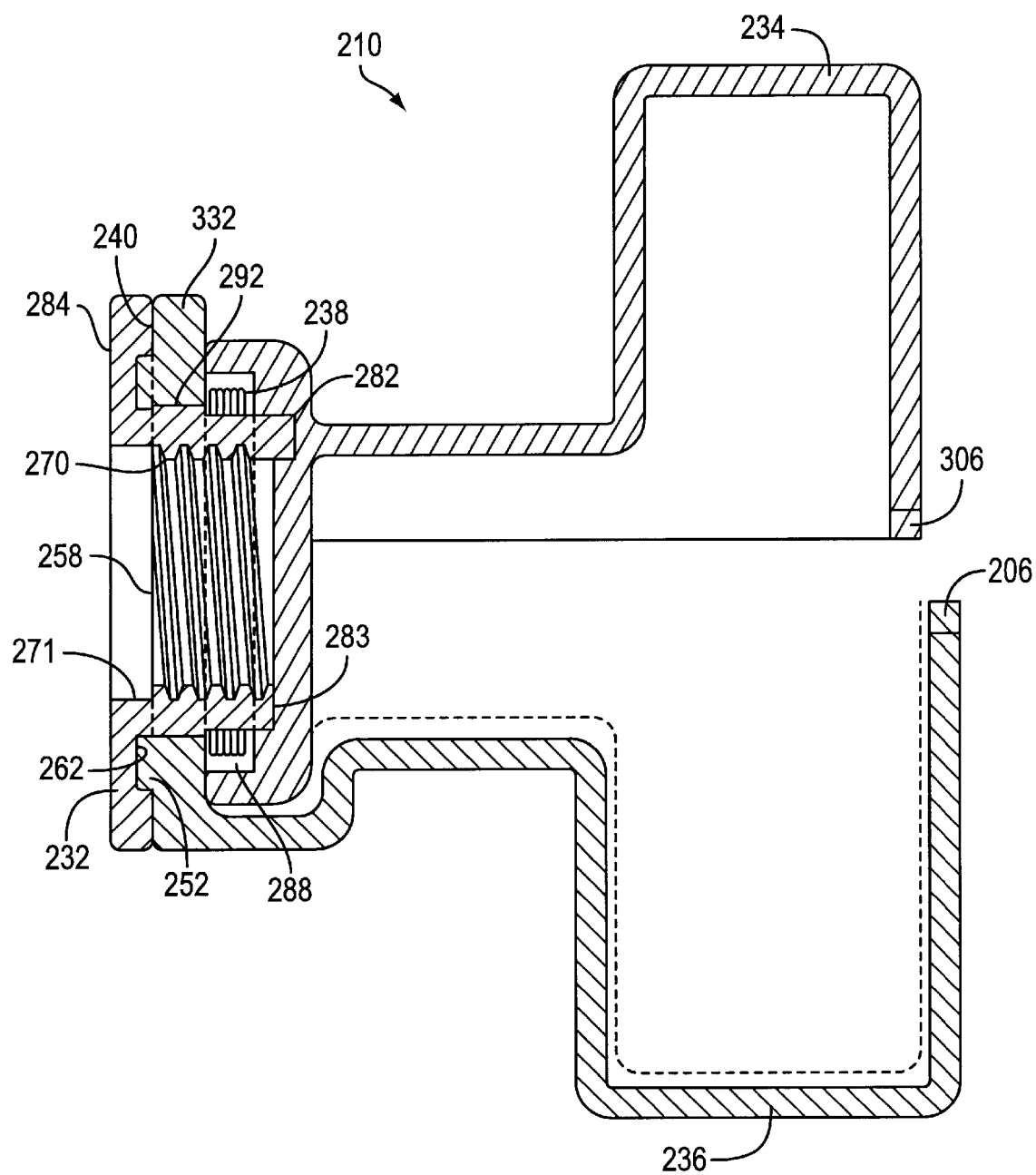
FIG. 15 is a partially sectioned side elevation view of an alternative embodiment of a safety shroud assembly in accordance with the invention.

FIG. 15 is an alternative embodiment of the shroud of the present invention 210, having a washer member 232, a stationary shield 234 and a movable shield 236 movably mounted on said stationary shield 234 and interconnected with said stationary shield 234 and said washer member, said washer member 232 being fastenably connected or secured to the stationary shield 234 by way of an alignment key or peg 282, that projects axially forwardly from the rear annular end face 284 of the washer member 232, and, if desired, a further ultrasonic-type weld connection 283. Any other bonding type operation can be used, e.g. glue, ultraviolet, screw, etc. A substantially semicircular segment-shaped front recess is 206 and 306 is provided on the movable and stationary shields 236 and 234 respectively for access to a tool bit screwed into the mandrel without removal of the protective shroud. For purposes of explanation and illustration, only certain sections of the shields and washer member will be specifically defined in the alternative embodiment of FIGS. 15–18, particularly where the designs differ, it being understood that the general makeup of such structures, defined by semi-cylindrical trough-like hood portions and the like, will generally be consistent with those structures described in the embodiment of FIGS. 1–14.

Figure 16:
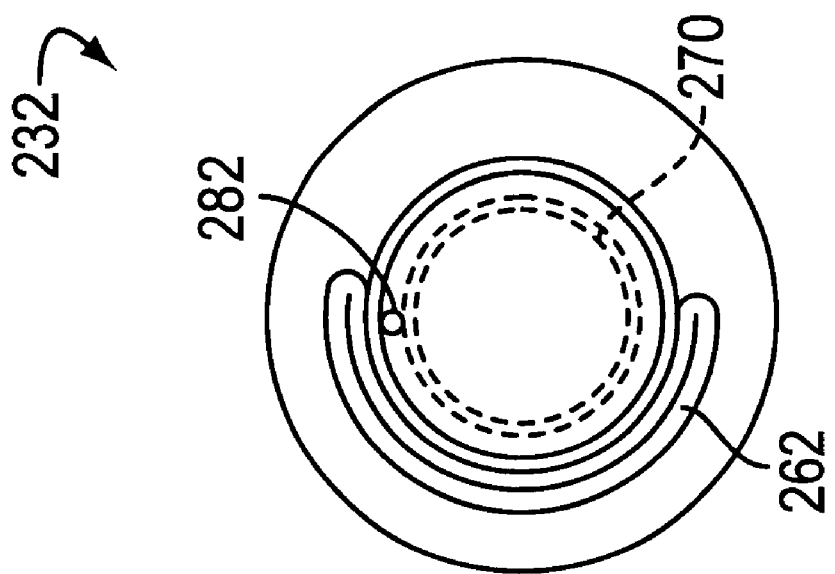
FIG. 16 is a front end view of the washer member of FIG. 15.

Whereas the stationary shield 34 of FIGS. 1–14 is fastened to the tool 10, the washer member 232 of FIG. 15 has an internally threaded bore 270 that is adapted for fastening or securing to the threaded housing 16 on a tool (see FIG. 1), while a non-threaded section 271 is provided to accommodate the non-threaded collar portion between the housing 16 and the front end 15 (see FIG. 1) usually found by way of example on Dremel brand hand tools. The torsion spring 238 is nested, supported and guided in an enlarged annular pocket 288, while an axially-rearwardly projecting alignment key or peg 252, formed on the rear face 240 of ring 332, guides the movable shield 236 within the washer member 232. The pocket 288, and the previous pocket 88 of FIGS. 1–14 can be modified to suit the function of the spring. As seen in FIG. 16, which is a front end view of the washer member 232 of FIG. 15, a substantially semi-circular guideway 262 extends over an arc slightly in excess of 180 degrees and receives and guides the alignment key 252 located on the rear face 240 of the movable rotating shield 236.

Figure 17:
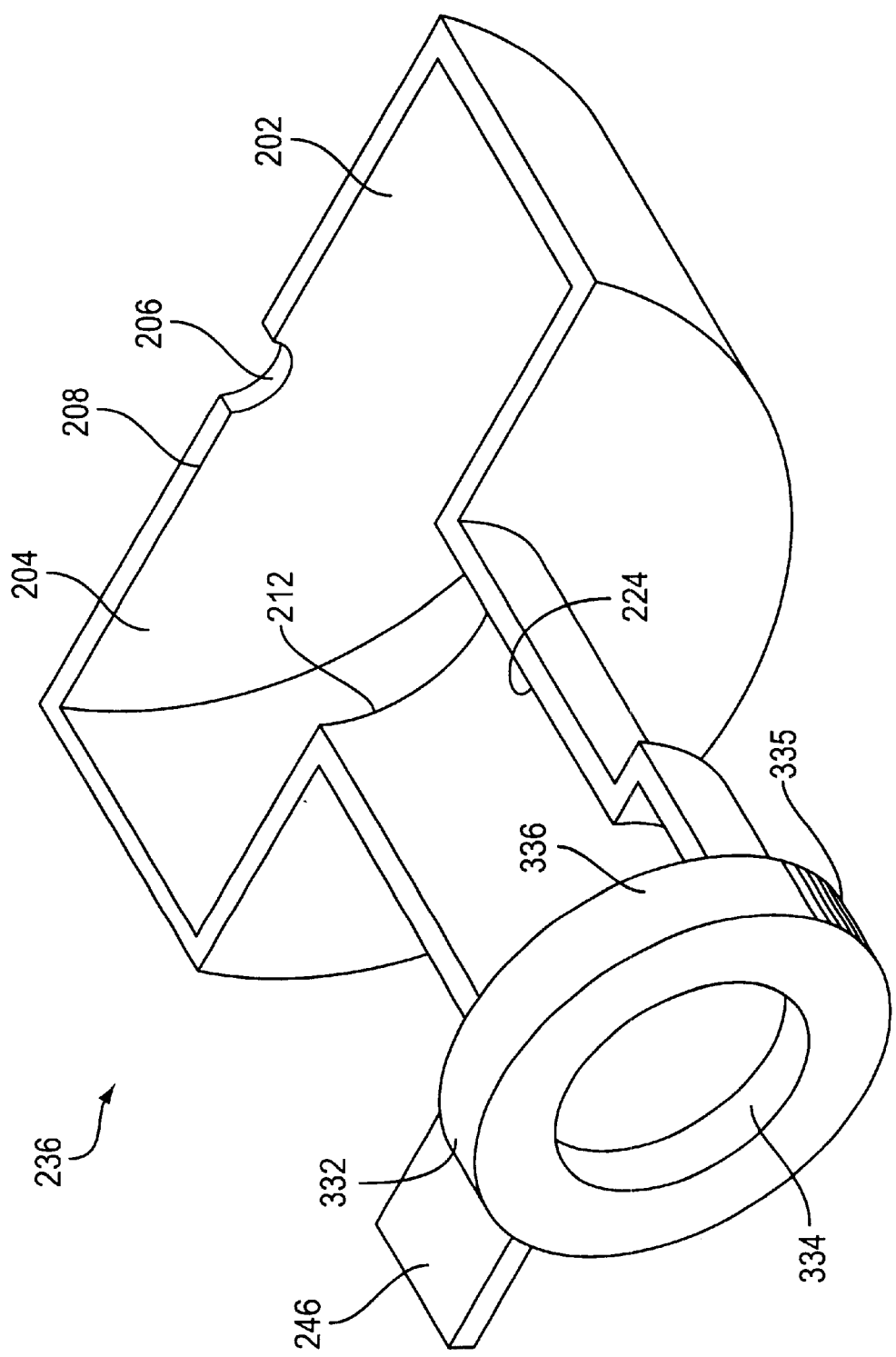
FIG. 17 is a perspective view of the movable shield of FIG. 15.
Figure 18:
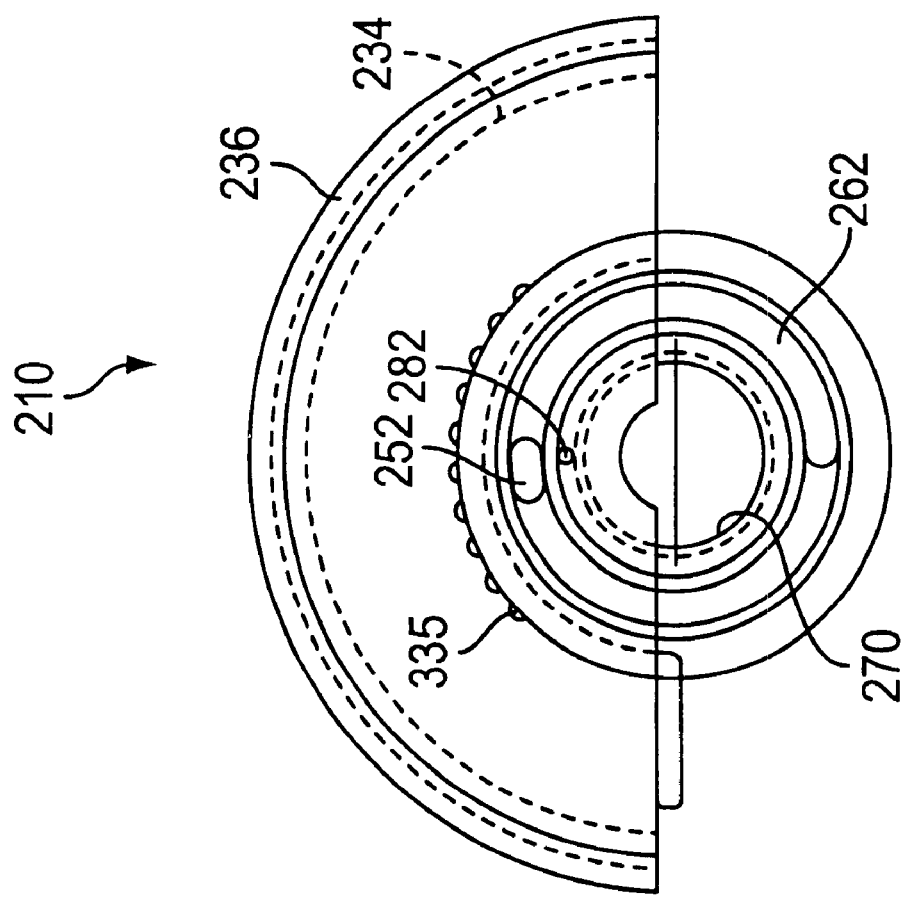
FIG. 18 is a front end view of the shroud of FIG. 15 shown in the open position.

FIG. 17 is a perspective view of the movable shield 236, which includes a substantially semi-cylindrical open hood 202, which is similar in shape but axially and radially larger than the open hood on the stationary shield 234, and an end wall 204 having a substantially semicircular segment-shaped front recess 206 formed midway along its exposed chordal edge 208. A generally semicylindrical channel 224 extends concentrically, coaxially and rearwardly from the rear recess 212 to an annular guide ring 332. The inner circumference 334 of ring 332 forms a bearing surface which pivots over the outer surface 292 (see FIG. 15) of the washer member 232. Also shown in FIG. 17, there is a finger or thumb tab or lever member 246 connected to the circumferential surface 336 of ring 332 for rotating the movable shield 236 about the stationary shield 234 (see FIG. 18). The lever member 246 shown in FIG. 17 is in a different axial location than the lever member 146 shown in FIG. 7, which location may provide easier access by the user's thumb and easier rotation of the movable shield 236 about the stationary shield 234. The location of the lever member 246 on the ring 332 may be altered as desired. Furthermore, a portion of the circumferential surface 336 may have ridges 335 or the like to enhance gripping of the ring 332 without using the lever member 246. Such ridges or ribs 335 may even replace the need for the lever member 246 altogether.

In the alternative embodiment of FIGS. 15–18, the washer member 232 that directly engages and fastens to the tool might act as an adapter member, particularly if the tools of different manufactures have different thread patterns on their threaded housings 16. Therefore, a protective shroud of the invention could be designed to fit tools by different manufacturers, with the only custom-designed part being the washer member 232. Of course, if a tool does not have a threaded housing, e.g., a non-current-Dremel brand tool, flexible shaft tools, or other, a washer or adapter member could be designed to securely or firmly engage such tool through a clamp, friction fit, force fit or the like. Also, having the washer member 232 fixed or coupled to the stationary shield 234 results in a product that is easier for the consumer to assemble, and more durable in the long run. The assembly of the alternative embodiment of FIGS. 15–18, and more particularly the interconnection of the stationary and movable shields 234 and 236 respectively via the spring member 238, is accomplished in the same manner as the shroud of FIGS. 1–14 using appropriate key sections and the like, with the primary difference between the two embodiments being whether the threaded portion is part of the washer member or is part of the stationary shield.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A protective shroud assembly for restricting access to a cutting tool mounted on a hand tool, comprising:
   a) a stationary shield having a threaded bore adapted to be threaded on said hand tool;
   b) a movable shield rotatably mounted on said stationary shield;
   c) a washer member adapted to be axially clamped to said hand tool by said stationary shield; and
   d) a torsion spring encircling said stationary shield and biasing said movable shield into a closed position about said stationary shield,
   e) wherein said stationary shield, said movable shield and said washer member are constructed to be attached to and removed from a hand tool as a single unit, and
   f) wherein said stationary shield and said movable shield each comprises a semi-cylindrical hood for covering said cutting tool, movable shield being disposed on the outside of said stationary shield, said movable shield being rotatable about said stationary shield.

2. The assembly of claim 1, wherein said stationary shield comprises a cylindrical sleeve about which said movable shield rotates.

3. The assembly of claim 2, wherein said threaded bore is formed within said cylindrical sleeve.

4. The assembly of claim 1, wherein said washer comprises an annular thrust bearing surface against which said movable shield rotates.

5. The assembly of claim 1, wherein said stationary shield and said movable shield each has a front end face having a recess formed therein for allowing access to said cutting tool without opening said shroud.

6. The assembly of claim 1, wherein said stationary shield and said movable shield define an open axially-extending gap therebetween.

7. The assembly of claim 1, further comprising a thumb tab provided on said movable shield.

8. The assembly of claim 1, wherein said stationary shield, said movable shield and said washer member are each formed of a clear see-through plastic material.

* * * * *